March 21, 1950     F. R. HOUSE     2,501,333
HOSE REEL
Filed Aug. 30, 1947
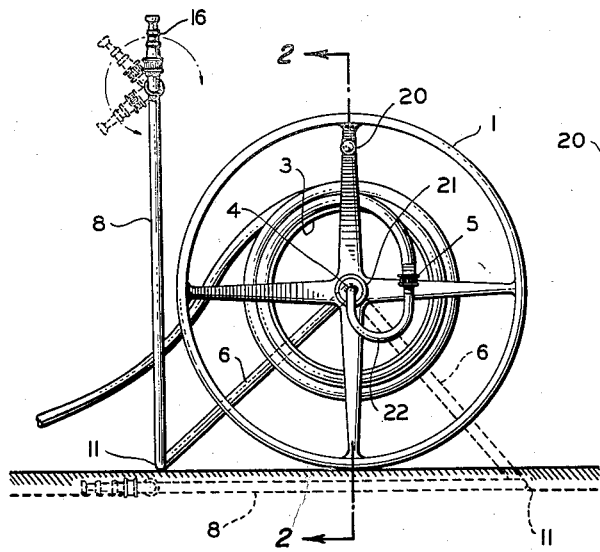
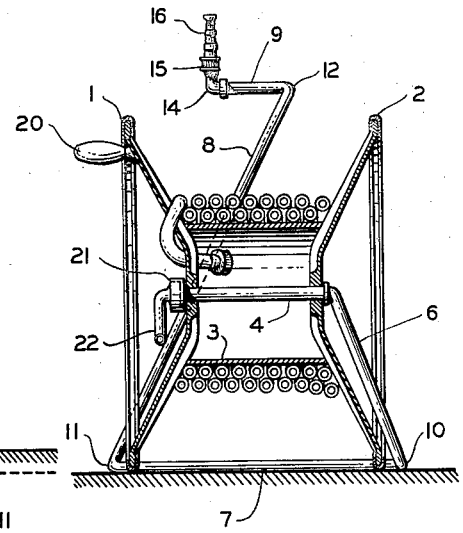
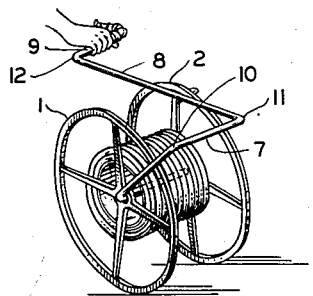
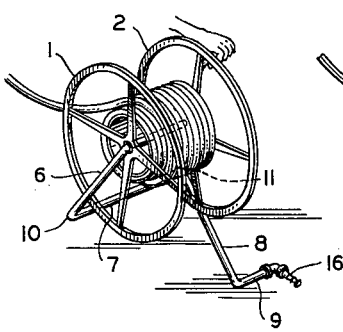
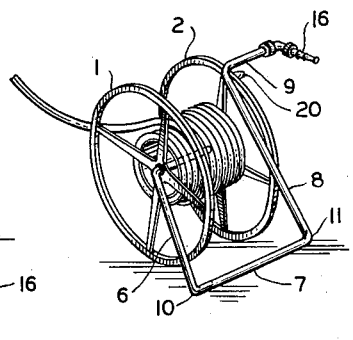
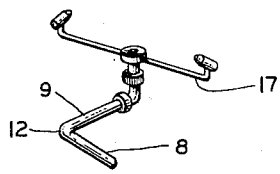
*INVENTOR.*
FRANK R. HOUSE
BY
Herbert H. Thompson
*his ATTORNEY.*

Patented Mar. 21, 1950

2,501,333

UNITED STATES PATENT OFFICE 2,501,333

HOSE REEL

Frank R. House, Baldwin, N. Y.

Application August 30, 1947, Serial No. 771,518

6 Claims. (Cl. 299—53)

This invention relates to garden sprinklers and combines in one unitary garden implement a hose reel and sprinkler stand. According to my invention, my improved multipurpose hose reel with the hose coiled thereon may be wheeled to the area in the lawn that is to be sprinkled, the hose unreeled far enough to connect to the faucet and the handle of the reel set in an upright position to act as an elevated support for a nozzle or rotary sprinkler. Not only does the aforesaid handle act as a nozzle support, but it also functions as a stand for the reel when unreeling or winding up the hose. When another place on the lawn is to be watered, the sprinkler stand is again grasped as a handle and the reel wheeled to its new position, the hose unreeling further or being partially reeled up as needed.

Referring to the drawings illustrating one form my invention may assume,

Fig. 1 is a side elevation of my improved reel and stand, showing a hose connected, the stand being in the position for sprinkling, but the dotted lines showing the stand and reel in the potion for reeling or unreeling the hose;

Fig. 2 is a vertical section of my reel and stand, taken on lines 2—2 of Fig. 1;

Fig. 3 is a perspective view of my invention, showing the reel as used to roll about with the sprinkling stand used as a handle;

Fig. 4 is a similar view, showing how the reel and stand are positioned when reeling or unreeling the hose, corresponding to the dotted line position of Fig. 1.

Fig. 5 is a similar view, showing another sprinkling position, and

Fig. 6 is a perspective view, showing how a rotary sprinkler head may be used on my improved sprinkler-reel.

Any suitable form of reel proper may be used with my invention. As shown, it comprises two spoked, metal wheels 1 and 2, preferably dished inwardly and spaced by a hollow cylinder 3 on which the hose is wound. The wheels are journaled on an axle 4 which is preferably made in the form of a pipe so as to form a part of the water supply piping for the sprinkler. At one end, pipe 4 is provided with a swivel joint 21 connecting it to a short U-shaped pipe 22 having hose coupling 5 connected to the other end thereof. At its other end, the axle-pipe extends generally radially and outwardly at 6 and around the rim of wheel 2, thence axially across both wheels at 7 and thence diagonally at 8 for a substantial distance and thence horizontally or axially for a short distance at 9 to form a handle. The length of sections 6, 7 and 8 and the bends or angles at 10 and 11 are such that when section 8 is laid flat on the ground as shown in dotted lines in Fig. 1, the reel is rotatably supported above the ground so that the hose may be readily reeled and unreeled. In this position, it will be noted that the part 6 supports the reel above the ground and extends rearwardly and the part 7 of the pipe furnishes a base of a breadth greater than that of the wheel. The part 8 extends diagonally along the ground for some distance, and furnishes a substantial base support, supporting the reel against tipping in any direction since the section 6 in the dotted line position extends to the rear of the axle 4, so that the section 7 on the ground lies well to the rear of the axle, while extension 8 extends both forwardly well in front of the axle and in front of the reel wheels and also extends diagonally across the face of the reel, as indicated in Figs. 2 and 4 to give the reel lateral support. The axle 4 is only actually supported at one side by the pipe 6, but the piping is made sufficiently strong to support the reel without serious bending, yet the reel is entirely open at one side, thus facilitating the reeling and unreeling operations by grasping handle 20.

When sections 6 and 8 are placed in the full line positions of Figs. 1 and 2, section 6 extends forwardly and section 8 extends upwardly preferably above the reel which at that time is resting on the ground, so that the sprinkler is held in that position by a substantial supporting area bounded by the bends or elbows 10, 11 and pipe 7 and the bottoms of the two wheels 1 and 2. In the reeling position, likewise a good support is furnished by the bends or elbows 10 and 11, pipe 7, pipe 8 and the forward bend 12 in pipe 8. The bend at 11 is preferably such that the pipe 8 extends at least halfway, if not more than halfway, across between the wheels 1 and 2.

Preferably, the outer end of pipe 8 is bent at 12 to form a short axially extending section 9 which is again bent at 14 and supplied with a coupling 15 suitable for attaching a hose nozzle 16 or rotary or other sprayer 17 (Fig. 6). The elbow 14 may be swivelled in the end of pipe 9, so that the nozzle may be swung to any desired position. (See dotted line positions in Fig. 1.) Being in an elevated position, the coupling 15 permits easy replacement or adjustment of the sprinkler without stooping. Also the reel frame or piping furnishes a mounting or support for the sprinkler, so that the conventional sprinkler base may be eliminated. The section 9 also furnishes a convenient handle for pushing or pulling the reel or rolling on the ground as shown in Fig. 3. Preferably, the center of the handle 9 is about midway between the wheels 1 and 2 so as to centrally position the pulling or pulling thrusts exerted by the hand. When the hose is reeled up the free or faucet end may be tucked inside the reel hub on the open side of the reel as shown in Fig. 2. The reel end is thereby held securely. As the hose end now bulges beyond the reel outer face it would interfere with the supporting pipe frame when reeling and unreeling, were it not for the fact that such frame lies on the other side of the reel only, as previously explained.

My multipurpose reel is also adapted for concentrated watering or small area sprinkling. For this purpose, the pipe framework may be placed in the reeling position as shown in Fig. 4 or in dotted lines as in Fig. 1, and the nozzle either removed or thrust into the ground; or the hollow framework may be positioned somewhat as shown in Fig. 3, except that the transverse portion 9, shown as grasped by the hand, is rotated counter-clockwise downwardly to position the same on the ground. In this position, the nozzle may be thrust into the ground for deep watering, if desired or removed.

Obviously, my invention is susceptible of many modifications within the scope of the appendant claims. Thus the pipe sections 6, 7, 8 and 13 might be varied in number and position or might be made as separate pipes coupled together with the usual pipe couplings instead of one or two pipes bent in the proper shape.

I am aware that combined hose reels and sprinklers have been proposed, but all such prior art devices involve many more parts than the ordinary hand reels and are hence heavier and much more expensive to build. My improved reel, however, has very few, if any more, parts than the standard simple reel and yet has the advantage of furnishing a sprinkler support with little additional parts, weight or cost.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A portable hose reel and sprinkler comprising a rotatable reel, a pipe forming a normally horizontal axle on which said reel is journaled, said pipe being adapted at one of its ends to be connected to a hose, the opposite end of the pipe extending substantially radially of the reel to a point beyond the reel, thence transversely of the reel to a point beyond the opposite side thereof, and thence diagonally across the major portion of the reel in a plane parallel to a plane containing said axle and substantially tangential of the reel to form thereby a support for the reel when reeling the hose, and alternatively to form an upright, the outer end thereof being adapted for attachment to a nozzle or other water sprayer.

2. A portable hose reel as claimed in claim 1, in which said pipe also has an outer short portion extending parallel to said axle and adapted to form a hand-hold on said member to aid in pushing or pulling the reel.

3. A portable hose reel and sprinkler comprising a rotatable reel, a pipe forming a normally horizontal axle on which said reel is journaled, said pipe being adapted at one of its ends to be connected to a hose, the opposite end of the pipe extending substantially radially of the reel to a point beyond the reel, thence transversely of the reel to a point beyond the opposite side thereof, and thence diagonally across the major portion of the reel in a plane parallel to a plane containing said axle and substantially tangential of the reel to form thereby a support for the reel when reeling the hose, and alternatively to form an upright, the outer end thereof being adapted for attachment to a nozzle or other water sprayer, said upright also being curved near its outer end to form a short portion extending parallel to said axle to form a grip for rolling the reel on its axle along the ground.

4. A portable hose reel and sprinkler comprising a rotatable reel, continuous piping forming an axle on which said reel is journaled, said piping being adapted to be connected to a hose at the axle end, and the other end of said pipe extending radially of the reel to extend beyond the reel at one side only of the reel, said pipe then extending transversely of the reel to a point beyond the opposite side thereof, and thence diagonally across the major portion of the reel in a plane parallel to a plane containing said axle but beyond the periphery of the reel to form a support for the reel in reeling the hose, and thence a short distance parallel to said axle, and a sprinkler connection at the outer end of said piping, whereby said piping forms alternatively a handle for pushing or pulling the reel and a support for the sprinkler.

5. A portable hose reel and sprinkler comprising a rotatable reel, continuous piping forming an axle near one end on which said reel is journaled, said piping being adapted to be connected to a hose at said end, the rest of the piping extending first radially of the reel to extend beyond the same at one side only, thence transversely of the reel, and thence diagonally across and beyond the reel in a plane parallel to a plane containing said axle to form thereby a support for the reel in reeling the hose, whereby the other side of the reel is left open to facilitate rotating the reel when reeling the hose.

6. A portable hose reel and sprinkler comprising a rotatable reel, continuous piping forming an axle near one end on which said reel is journaled, said piping being adapted to be connected to a hose at said end, the rest of the piping extending first radially of the reel to extend beyond the same at one side only, thence transversely of the reel, and thence diagonally across and beyond the reel in a plane parallel to a plane containing said axle to form thereby a support for the reel in reeling the hose, whereby the other side of the reel is left open to facilitate rotating the reel when reeling the hose, said diagonal portion also being adapted to form an upright when the reel is resting on the ground, the outer end thereof being adapted for attachment to a nozzle or other water sprayer.

FRANK R. HOUSE.

REFERENCES CITED

The following references are of record in the file of this patent:

UNITED STATES PATENTS

| Number | Name | Date |
|---|---|---|
| 271,738 | Pusey | Feb. 6, 1883 |
| 400,030 | Wylie | Mar. 19, 1889 |
| 1,255,854 | Boss | Feb. 12, 1918 |